US009926105B2

(12) United States Patent
Tsui

(10) Patent No.: US 9,926,105 B2
(45) Date of Patent: *Mar. 27, 2018

(54) COLLAPSIBLE HOUSEHOLD CONTAINERS

(71) Applicant: Sam Tung Tsui, Hung Hom (HK)

(72) Inventor: Sam Tung Tsui, Hung Hom (HK)

( * ) Notice: Subject to any disclaimer, the term of this patent is extended or adjusted under 35 U.S.C. 154(b) by 0 days.

This patent is subject to a terminal disclaimer.

(21) Appl. No.: 14/247,995

(22) Filed: Apr. 8, 2014

(65) Prior Publication Data

US 2015/0251808 A1  Sep. 10, 2015

(30) Foreign Application Priority Data

Mar. 10, 2014 (DE) .................... 20 2014 101 047 U

(51) Int. Cl.
*B65D 6/00* (2006.01)
*B65D 21/08* (2006.01)
*A45F 3/20* (2006.01)
*A47L 19/04* (2006.01)
*B07B 1/02* (2006.01)
*D06F 95/00* (2006.01)
*A47L 19/02* (2006.01)
*B23P 19/00* (2006.01)
*B29C 45/00* (2006.01)
*B29C 65/48* (2006.01)
(Continued)

(52) U.S. Cl.
CPC ............. *B65D 21/086* (2013.01); *A45F 3/20* (2013.01); *A47L 19/02* (2013.01); *A47L 19/04* (2013.01); *B07B 1/02* (2013.01); *B23P 19/00* (2013.01); *B29C 45/0017* (2013.01); *B29C 65/48* (2013.01); *D06F 95/002* (2013.01); *A45F 2003/205* (2013.01); *B29L 2031/712* (2013.01); *B29L 2031/713* (2013.01); *B29L 2031/7132* (2013.01); *B65D 1/225* (2013.01); *B65D 1/265* (2013.01); *B65D 1/34* (2013.01); *B65D 25/2832* (2013.01); *B65D 25/2852* (2013.01); *B65D 25/2888* (2013.01); *Y10T 29/49826* (2015.01)

(58) Field of Classification Search
CPC ...... B65D 21/086; B65D 1/265; B65D 37/00; A45F 3/20; A45F 2003/205; A45C 7/0036; A45C 7/0077
See application file for complete search history.

(56) References Cited

U.S. PATENT DOCUMENTS 5,900,293 A   5/1999  Zettle
6,354,456 B2  3/2002  Rapson
(Continued)

OTHER PUBLICATIONS

Normann Copenhagen, Strainer blue, Funnel & Strainer, 6 pages, visited Dec. 19, 2013, available at <http://www.normann-copenhagen.com/products/strainer>.

Primary Examiner — Shawn M Braden
(74) Attorney, Agent, or Firm — Hinshaw & Culbertson LLP

(57) ABSTRACT

Collapsible household containers having a foldable wall section with shape-retaining characteristics are disclosed. In particular, collapsible laundry baskets, buckets, colanders, dish drainers, and cups are provided. The folding region may include foldable tiers of a flexible material, each tier having at least one stable, relatively expanded position and at least one stable, relatively collapsed position; and an intervening, non-folding tier composed of a different, relatively rigid material.

25 Claims, 16 Drawing Sheets

(51) Int. Cl.
  *B65D 25/28*  (2006.01)
  *B65D 1/22*  (2006.01)
  *B65D 1/26*  (2006.01)
  *B65D 1/34*  (2006.01)
  *B29L 31/00*  (2006.01)

(56) References Cited

U.S. PATENT DOCUMENTS

| | | |
|---|---|---|
| 6,705,471 B2 | 3/2004 | Kataoka |
| 7,654,402 B2 | 2/2010 | Kusuma et al. |
| 7,678,271 B2 | 3/2010 | Curtin |
| D656,800 S | 4/2012 | Lee et al. |
| 9,044,082 B2 * | 6/2015 | Kusuma ............... A45F 3/20 |
| 2006/0096929 A1 * | 5/2006 | Repp .................. A47J 19/00 |
| | | 210/740 |
| 2009/0183565 A1 * | 7/2009 | Shamoon ............ G01F 19/00 |
| | | 73/426 |
| 2015/0251795 A1 * | 9/2015 | Tsui ................. B65D 1/0292 |
| | | 215/306 |
| 2015/0253055 A1 * | 9/2015 | Tsui ................. B65D 21/086 |
| | | 62/62 |
| 2016/0347503 A1 * | 12/2016 | Tsui ................. B65D 1/0292 |

* cited by examiner

Fig. 25
Fig. 26
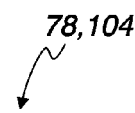
Fig. 27
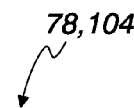

COLLAPSIBLE HOUSEHOLD CONTAINERS

CROSS REFERENCE TO RELATED APPLICATIONS

This application claims priority under 35 U.S.C. § 119 to German patent application DE 20 2014 101 047.5, filed Mar. 10, 2014, the entire contents of which are incorporated herein by reference.

FIELD OF THE INVENTION

The present invention relates to collapsible containers. More particularly, open-top, shape-retaining collapsible containers or vessels for kitchen and home use are provided, including laundry baskets, buckets, and colanders, with improved structural strength in a collapsible region compared to existing collapsible containers.

BACKGROUND OF THE INVENTION

It is desirable for a household container to be able to collapse to relatively compact dimensions for storage or transport when the container is either not in use or being used to hold less than its maximum volume capacity of contents. Collapsible kitchenware and houseware containers of various types exist to accommodate these general needs. For example, one type of existing collapsible colander includes a stiff or rigid top section connected to a stiff or rigid bottom section by a foldable wall section that snap-folds between or among two or more positions, including at least a fully expanded position and a fully collapsed position, and in some instances, one or more intermediate, partially collapsed positions. However, because the material used to make the foldable wall section must be flexible enough to fold, it typically offers little or no resistance to deformation caused by lateral forces, such as an object bumping into or pressing against the side of the container, or a user attempting to grasp or lift the container by the flexible wall section, which could result in the contents being damaged, undesirably shifted, or spilled.

A need therefore exists for kitchenware and houseware containers that are collapsible and expandable; self-supporting in at least a fully collapsed and a fully expanded state, if not in one or more intermediate, partially expanded states; and resistant to structural deformation over at least a portion of a collapsible wall region.

BRIEF SUMMARY OF THE INVENTION

The present invention provides improved collapsible household containers and methods of making them. According to one aspect of the invention, a collapsible container is provided, comprising a generally annular top tier; a bottom tier including a generally horizontal support surface; and a collapsible wall section connecting the top tier to the bottom tier, the collapsible wall section including at least three stacked, generally annular tiers, at least a middle one of which is rigid, being formed of a different material than adjacent flexible tiers disposed above and below the middle tier. The top and bottom tiers of the container may also be rigid and formed of a different material than the flexible tiers of the collapsible wall section. The collapsible wall section, top tier, and bottom tier collectively define a container body having a top opening, a generally closed bottom comprising the generally horizontal support surface of the bottom tier, and a generally closed periphery comprising at least a part of the top tier and at least a part of the collapsible wall section. The flexible tiers are configured to fold between relatively expanded and relatively collapsed positions. The size of the container volume can be increased by folding at least one of the flexible tiers from a relatively collapsed to a relatively expanded position and can be decreased by folding at least one of the flexible tiers from a relatively expanded to a relatively collapsed position. Preferably, the flexible tiers are stable in relatively expanded positions and relatively collapsed positions, so that the container is self-supporting in each of its relatively expanded and relatively collapsed states.

Preferably, to facilitate snap-through movement between the folded and unfolded states, each flexible tier is provided with two living hinges comprising very narrow annular bands of flexible material, at which the material suddenly tapers down to a sharply reduced thickness, at the top and bottom ends of the flexible tier. Beyond the ends of the flexible tier, the material suddenly tapers back out to an increased thickness, and a wider (i.e., taller) band of the flexible material of increased thickness is disposed between each living hinge and the adjacent rigid tier of a different material, where applicable. In addition to facilitating snap-through movement between states, the thinned regions also permit each flexible tier to fold more compactly against adjacent tiers, promote stability in the folded state by minimizing forces tending to straighten the material at the bent region, and promote the formation of a folded crease at a precise, consistent location each time the tier is folded.

In certain embodiments, which correspond to methods of making containers according to another aspect of the invention, the middle tier is composed of a polypropylene, metal, or nylon material, and the flexible tiers are composed of a silicone material or a thermoplastic elastomer. For example, flexible thermoplastic elastomer tiers may be connected to the rigid middle tier by overmolding. Optionally, and particularly in the case of a metal or nylon rigid tier, the connection between the rigid tier and an adjacent flexible tier (for example made of silicone) may be strengthened by adhesive material disposed in adhesive contact with a surface of the middle tier and an adjacent surface of the flexible tier. Alternatively, other suitable means such as mechanical fasteners may be employed to connect a rigid tier to an adjacent flexible tier.

In some embodiments, each tier of the container is at least substantially imperforate, so that the container can serve to hold liquid. In other embodiments, the container has perforations serving to drain liquid and/or facilitate aeration, as in colanders, dish drainers, buckets adapted as sand sifters, and certain embodiments of laundry baskets.

In still other embodiments, at least a portion of at least one of the tiers is air permeable to permit some airflow into and out of the container without passing through the top opening.

In yet other embodiments, the top tier comprises at least one attached handle.

According to another aspect of the invention, a collapsible dish drainer is provided having a collapsible wall structure generally as described above. The bottom tier of the drainer includes a generally horizontal support surface with a drain and a plurality of parallel, upstanding partitions arranged to support dishware standing on edge between adjacent partitions. Advantageously, said drain is configured to be plugged by an insertable drain plug to render the body of the drainer at least substantially watertight. Together with the drainer, a separate, collapsible domed lid may be provided. The domed lid may have a substantially similar structure to that of the drainer itself, but slightly smaller and imperforate, while also including a handle set into a generally horizontal panel of its top tier. The lid is configured to be supported on said top drainer tier in a mating configuration with the top tier of the drainer, whether the collapsible lid is oriented right-side-up (i.e., with its opening facing down) or upside-down. When upside-down, the collapsible lid is configured to nest inside the drainer body, at or below the highest portion of the top drainer tier and at least substantially within the interior volume below the drainer top opening, when the drainer and the lid are both in fully expanded states. Then, the lid is configured to collapse together with the drainer, remaining at or below the highest portion of the drainer top tier and at least substantially within the drainer volume when the drainer and the lid are both in fully collapsed states.

According to yet another aspect of the invention, a collapsible cup is provided. The collapsible cup may advantageously be used as a drinking cup or a measuring cup, for example. The collapsible cup includes a collapsible wall structure, substantially as described above, and a handle pivotally connected to its top tier. When the cup is fully collapsed, the handle is configured to pivot into a position in which a portion of the handle extends beneath and generally parallel to the bottom tier of the cup.

BRIEF DESCRIPTION OF THE DRAWINGS

FIG. 25 is a top perspective view of the dish drainer shown in FIG. 16, having an upside-down collapsible lid nested therein, drainer and lid in fully collapsed states.

FIG. 26 is a side elevation view of the dish drainer shown in FIG. 16, having an upside upside-down collapsible lid nested therein, drainer and lid in fully collapsed states.

FIG. 27 is a side elevation view of the dish drainer shown in FIG. 16, having an upside-down collapsible lid nested therein, both drainer and lid in fully expanded states.

DETAILED DESCRIPTION OF THE INVENTION

Figure 4:
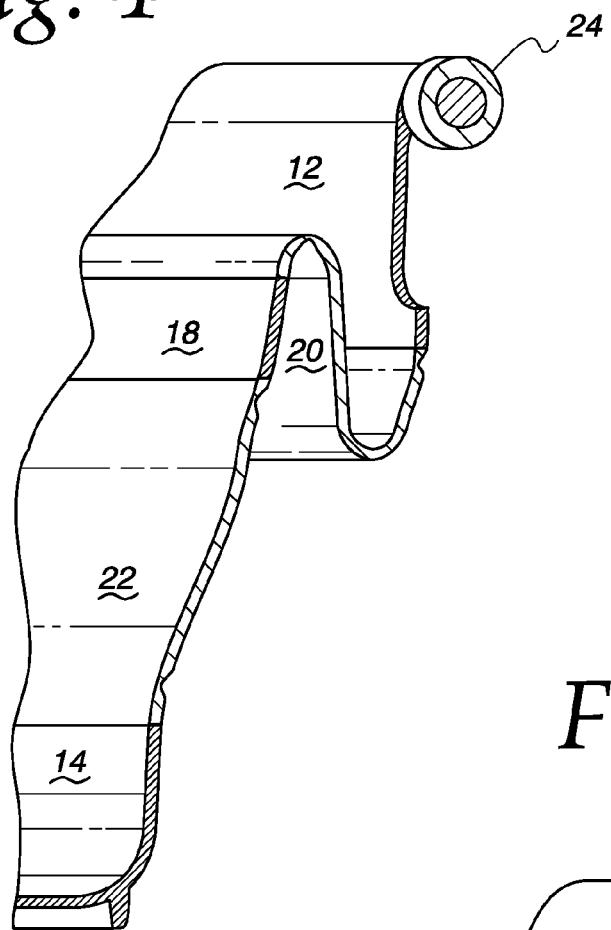
FIG. 4 is a fragmentary cross-sectional view of a wall structure of the laundry basket shown in FIG. 1, in a partially collapsed state.
Figure 5:
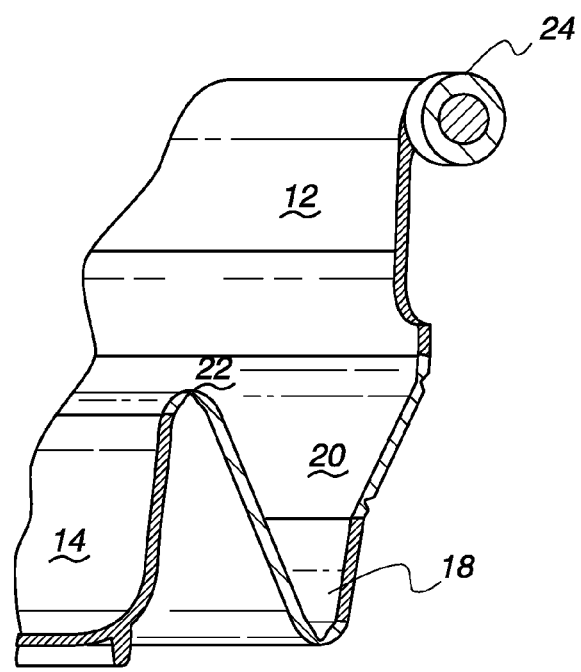
FIG. 5 is a fragmentary cross-sectional view of a wall structure of the laundry basket shown in FIG. 1, in another partially collapsed state.
Figure 6:
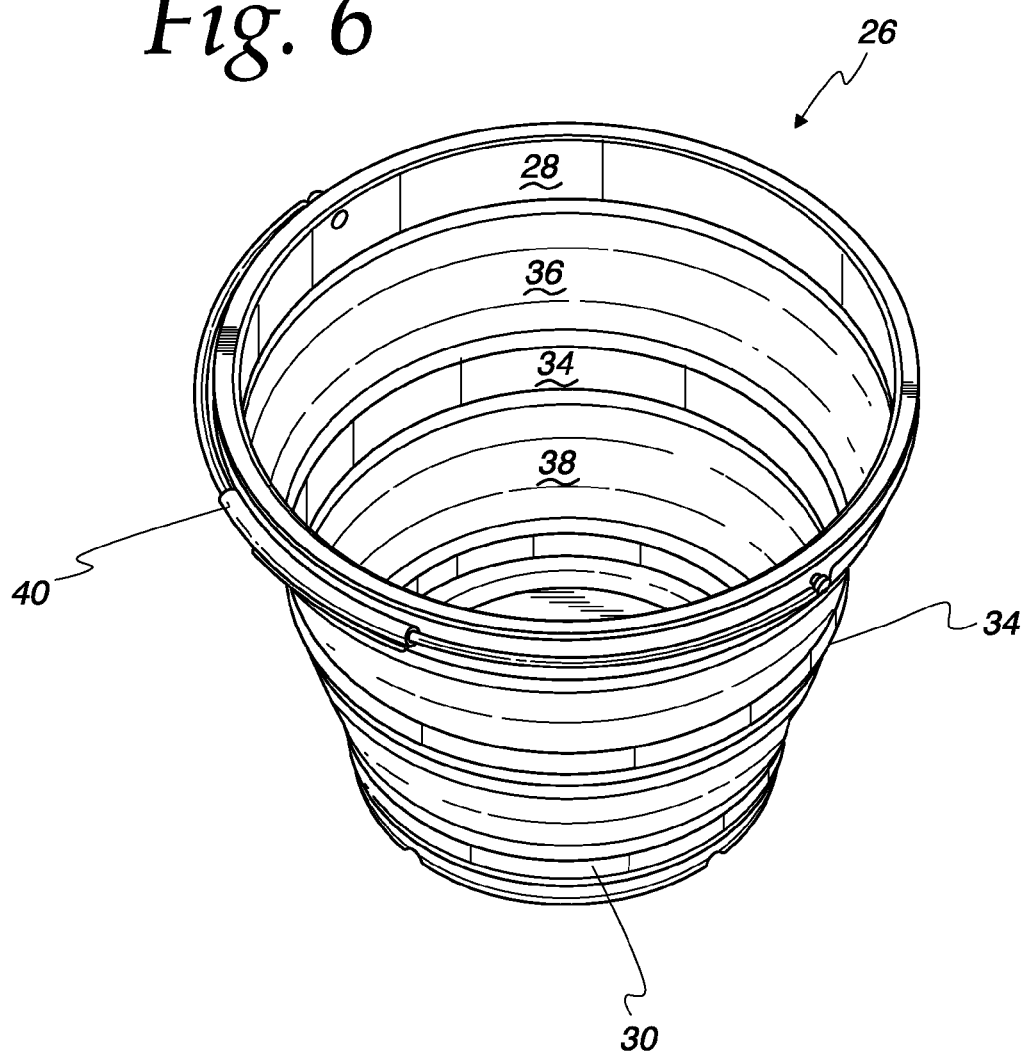
FIG. 6 is a perspective view of a collapsible bucket according to another aspect of the invention, in a fully expanded state.
Figure 7:
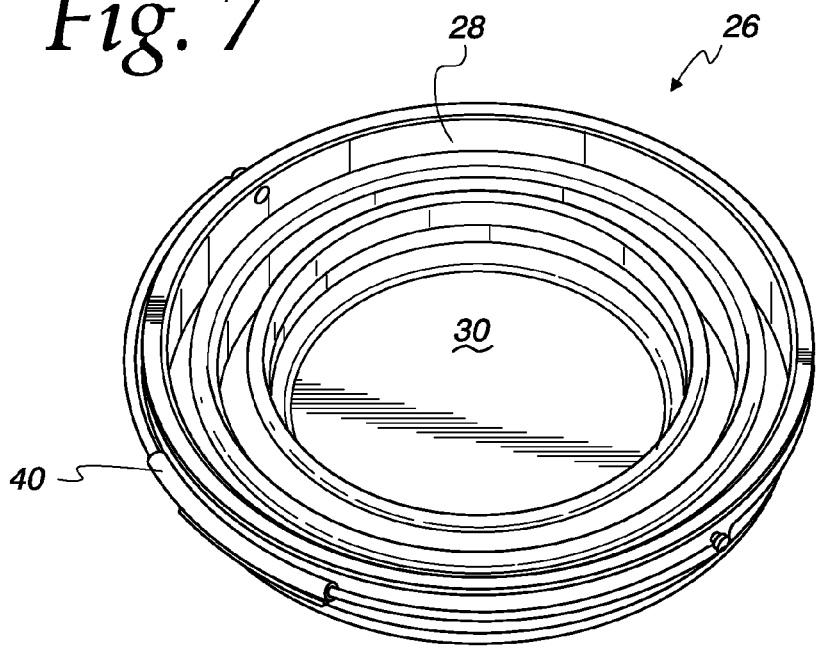
FIG. 7 is a perspective view of the bucket shown in FIG. 6, in a fully collapsed state.
Figure 8:
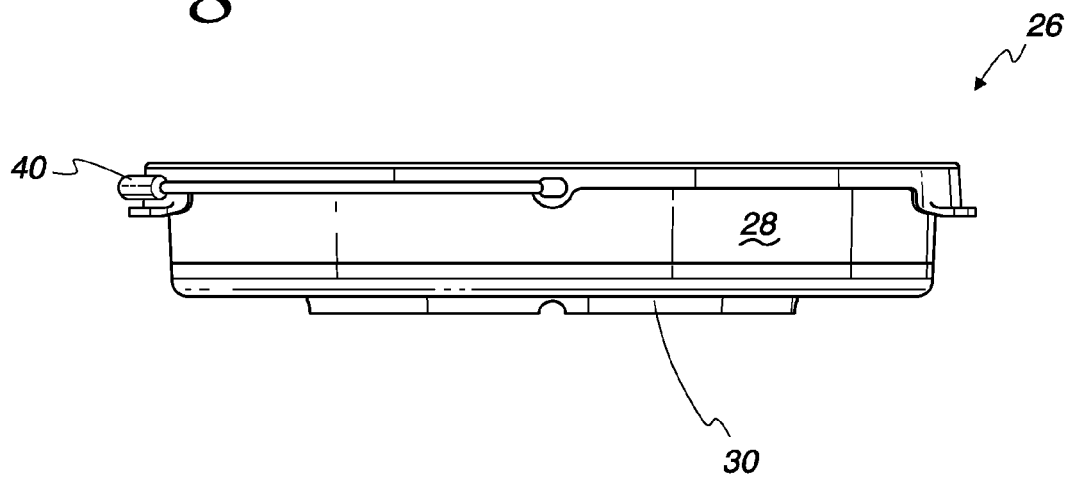
FIG. 8 is a side elevation view of the bucket shown in FIG. 6, in a fully collapsed state.
Figure 9:
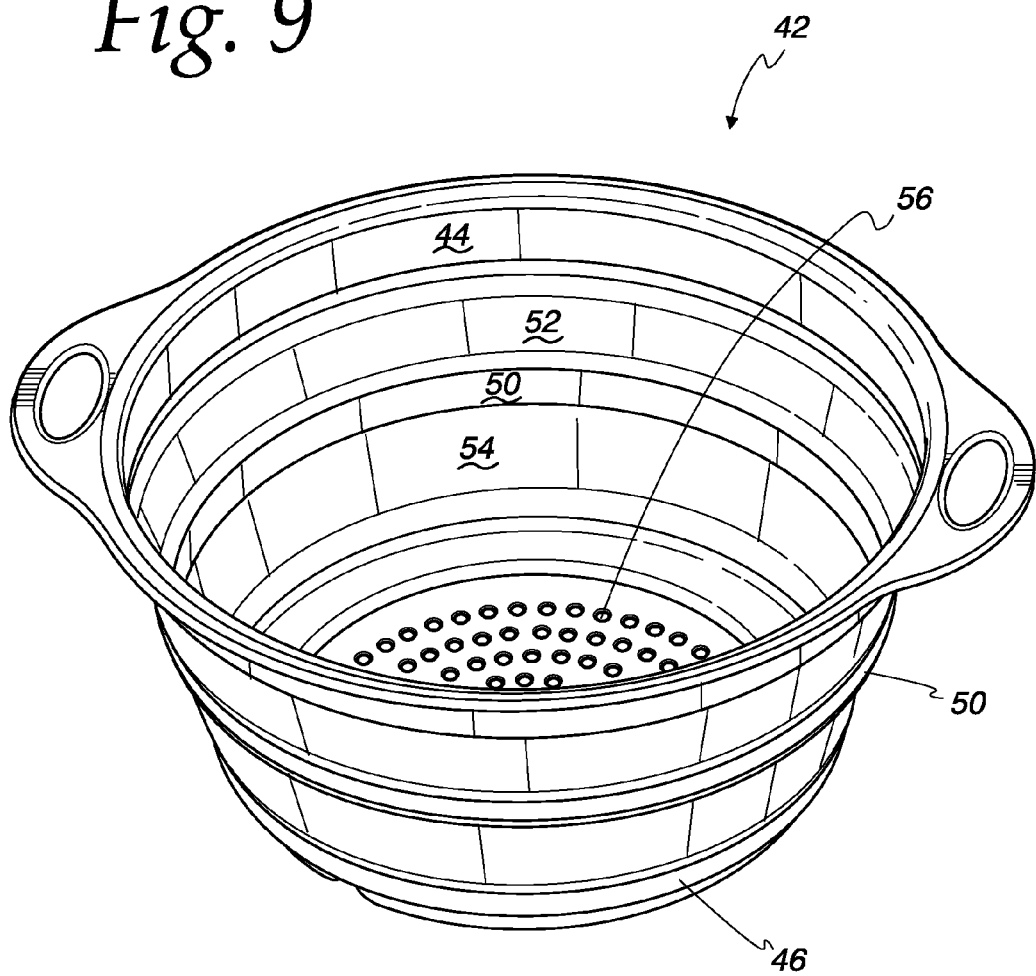
FIG. 9 is a perspective view of a collapsible colander according to another aspect of the invention, in a fully expanded state.
Figure 10:
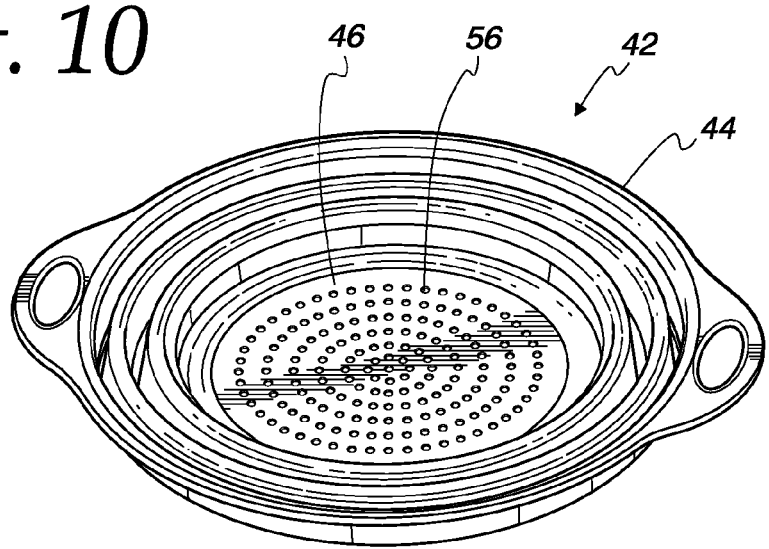
FIG. 10 is a perspective view of the collapsible colander shown in FIG. 9, in a fully collapsed state.
Figure 11:
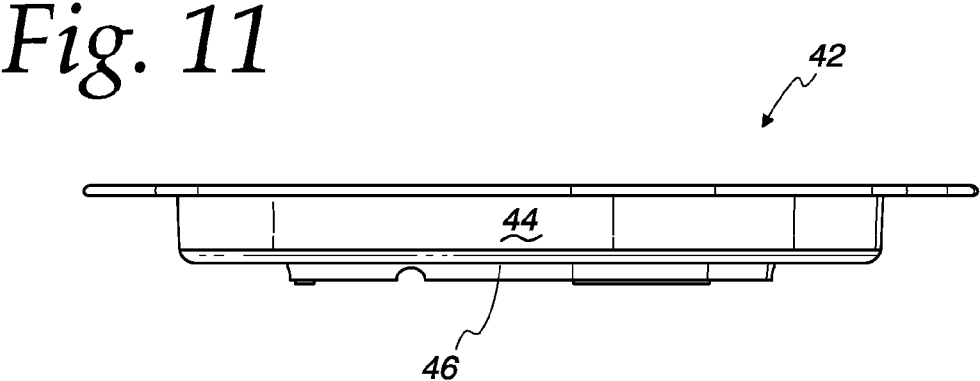
FIG. 11 is a side elevation view of the collapsible colander shown in FIG. 9, in a fully collapsed state.
Figure 12:
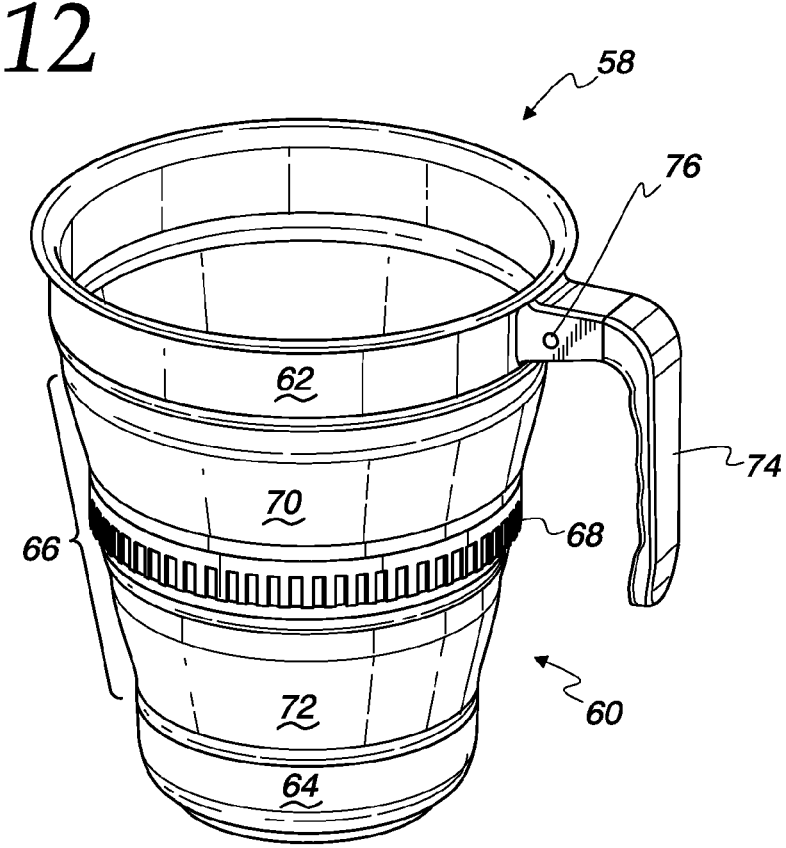
FIG. 12 is a perspective view of a collapsible cup according to still another aspect of the invention, in a fully expanded state.
Figure 13:
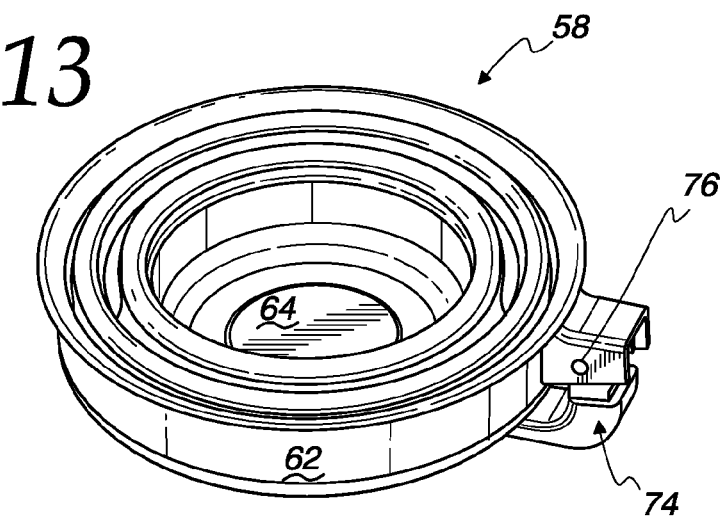
FIG. 13 is a perspective view of the cup shown in FIG. 12, in a fully collapsed state.
Figure 14:
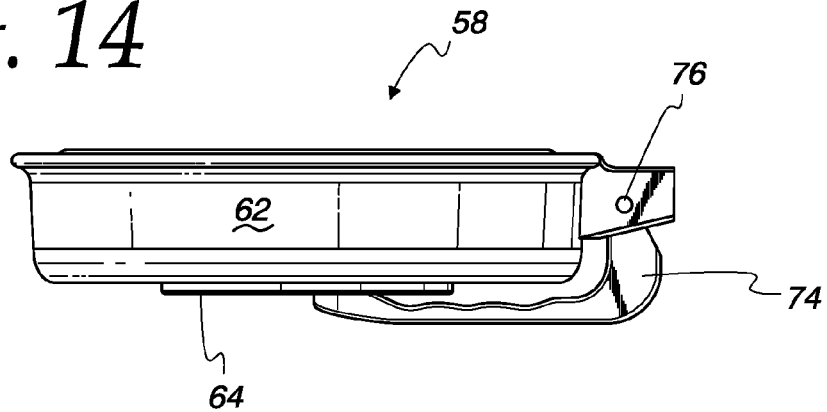
FIG. 14 is a side elevation view of the cup shown in FIG. 12, in a fully collapsed state.
Figure 15:
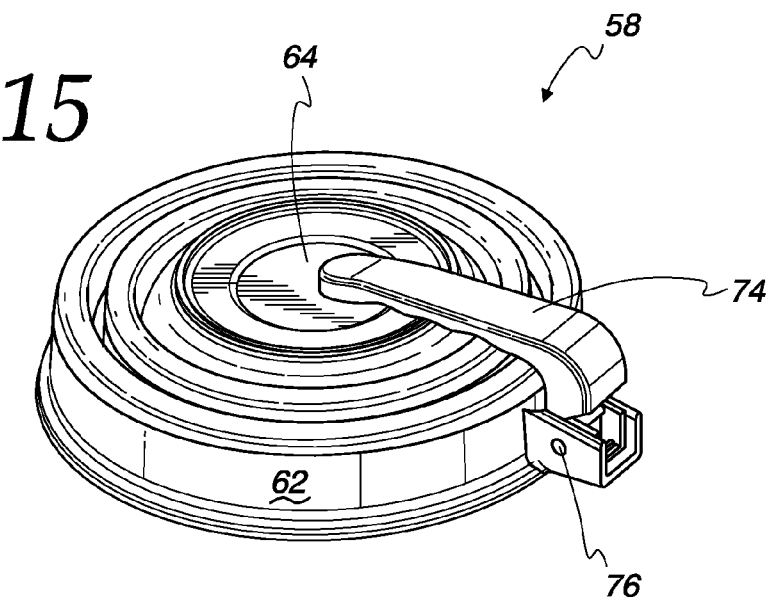
FIG. 15 is a bottom perspective view of the cup shown in FIG. 12, in a fully collapsed state.
Figure 16:
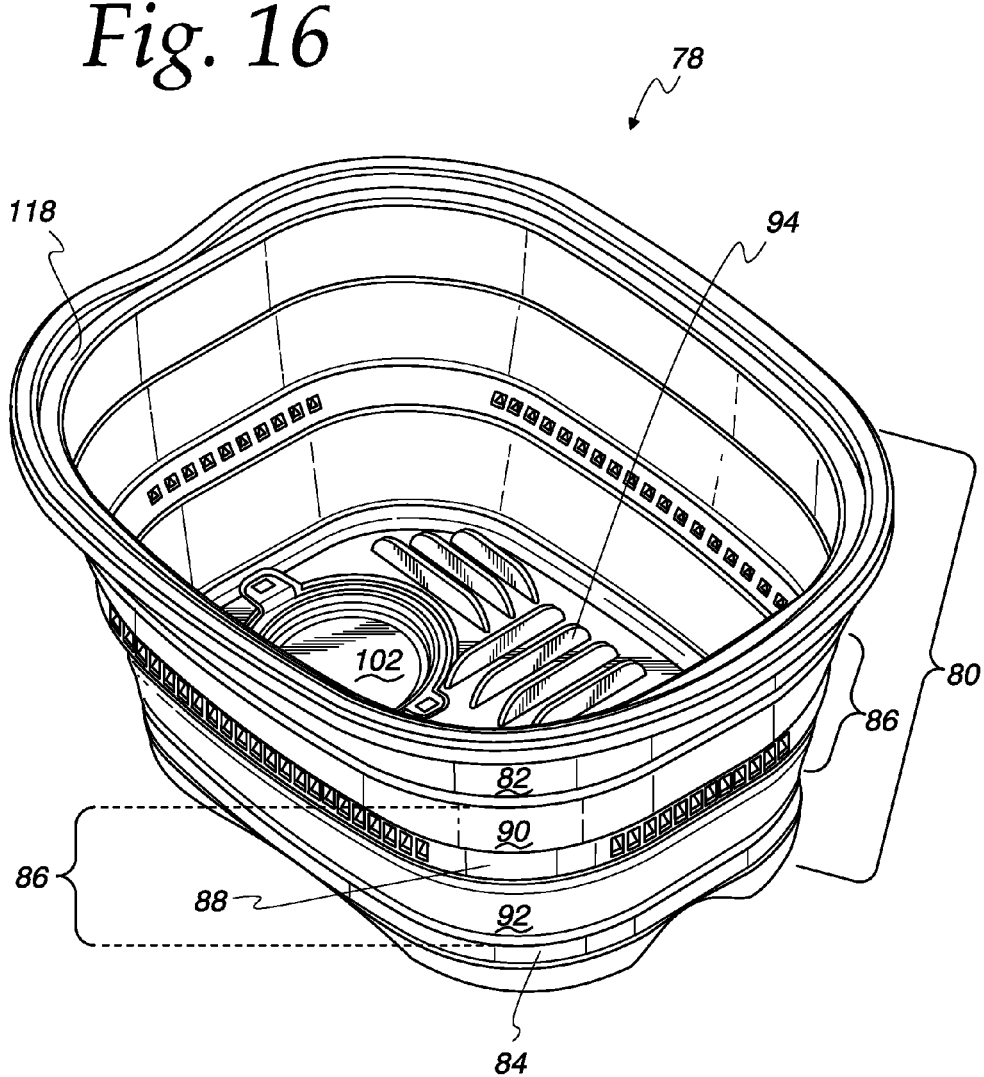
FIG. 16 is a top perspective view of a collapsible dish drainer according to yet another aspect of the invention, in a fully expanded state.
Figure 17:
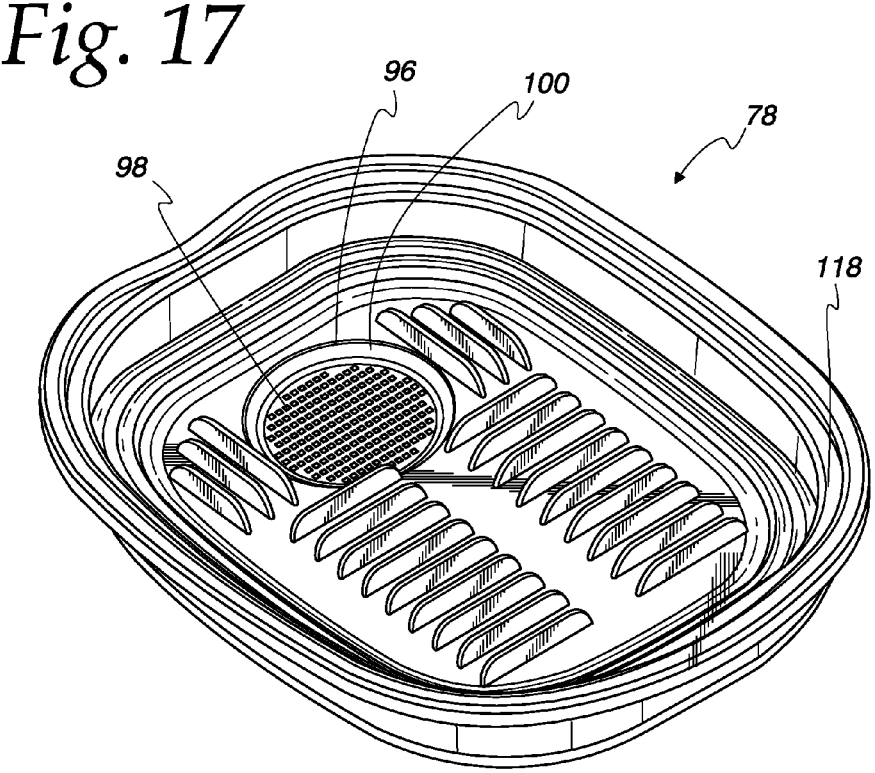
FIG. 17 is a top perspective view of the dish drainer shown in FIG. 16, in a fully collapsed state.
Figure 18:
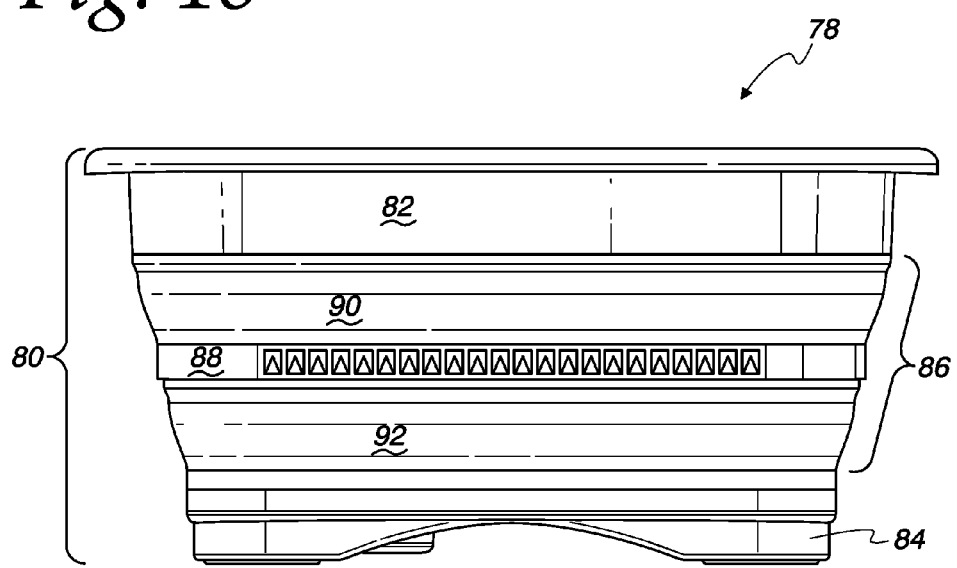
FIG. 18 is a side elevation view of the dish drainer shown in FIG. 16, in a fully expanded state.
Figure 19:
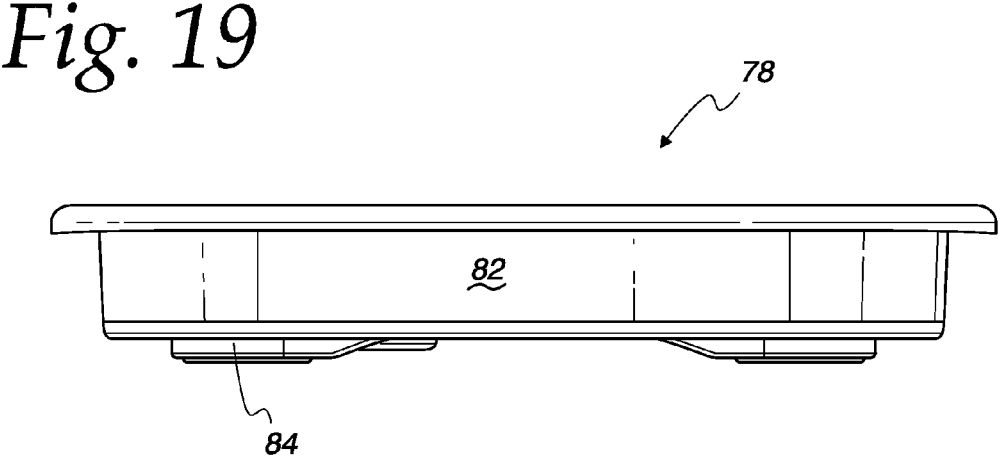
FIG. 19 is a side elevation view of the dish drainer shown in FIG. 16, in a fully collapsed state.

Collapsible kitchenware and houseware containers with improved shape retention and structural integrity in accordance with the present invention are described in this section, with reference to a collapsible laundry basket 10 depicted in FIGS. 1-5, a collapsible bucket 26 depicted in FIGS. 6-8, a collapsible colander 42 depicted in FIGS. 9-11, a collapsible cup 58 depicted in FIGS. 12-15, and a collapsible drainer 78 depicted in FIGS. 16-27.

Turning to FIGS. 1-5, a laundry basket 10 according to one embodiment of the invention is described and illustrated. Laundry basket 10 includes a rigid top tier 12, a rigid bottom tier 14, and a collapsible wall section 16 that may be collapsed and expanded to vary the overall height dimension of laundry basket 10 and thus the available volume for laundry. Wall section 16, in turn, includes a rigid middle tier 18 between two flexible tiers 20 and 22. Additional tiers may be included in the collapsible wall section, preferably adhering to the alternating arrangement in which a flexible tier is connected above and below each rigid tier.

Optionally but preferably, laundry basket 10 includes integrally formed or otherwise connected or attached handles, such as handles 24 shown as being integral to top tier 12. Additional lower handles may be formed as slot openings in middle tier 18. Also, the body of laundry basket 10 may include lateral openings (not shown) to allow its contents to air out, as is particularly beneficial when laundry basket 10 is used as a hamper for dirty laundry. The lateral openings may be formed in rigid middle tier 18 and/or in any flexible tier.

Figure 1:
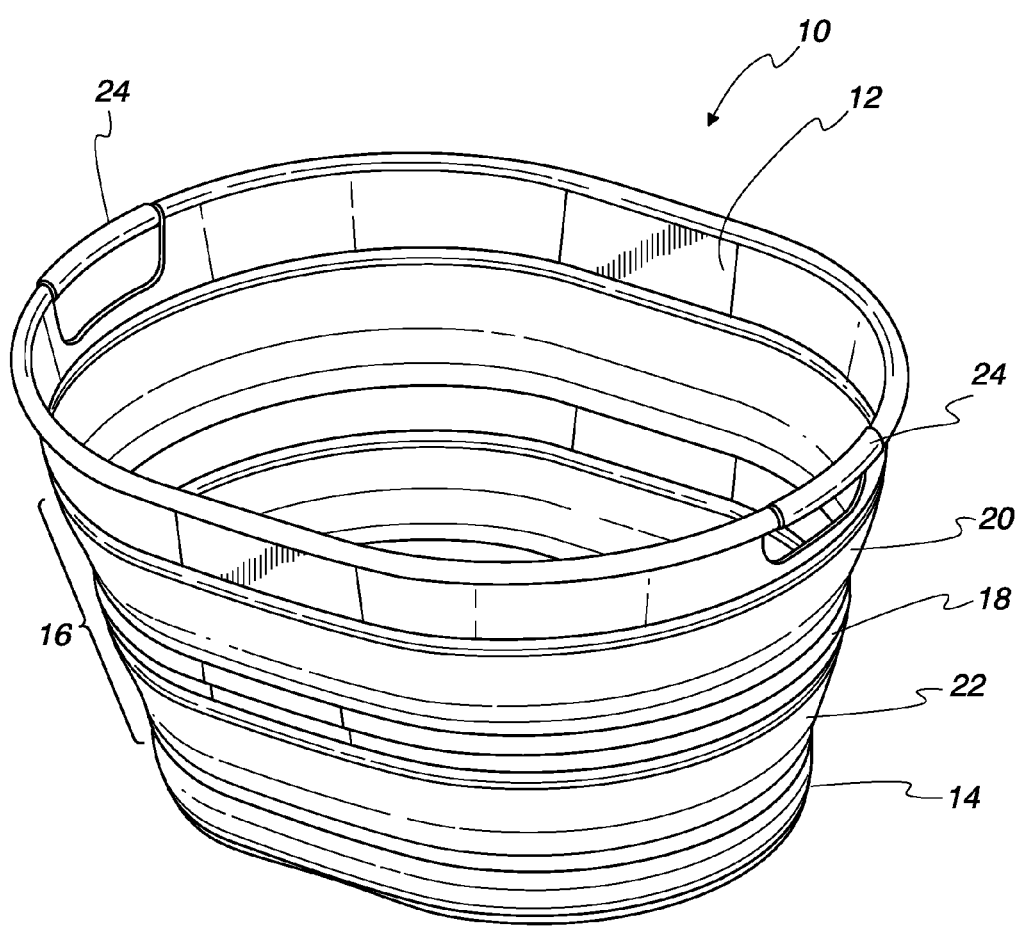
FIG. 1 is a perspective view of a collapsible laundry basket according to one aspect of the invention, in a fully expanded state.
Figure 2:
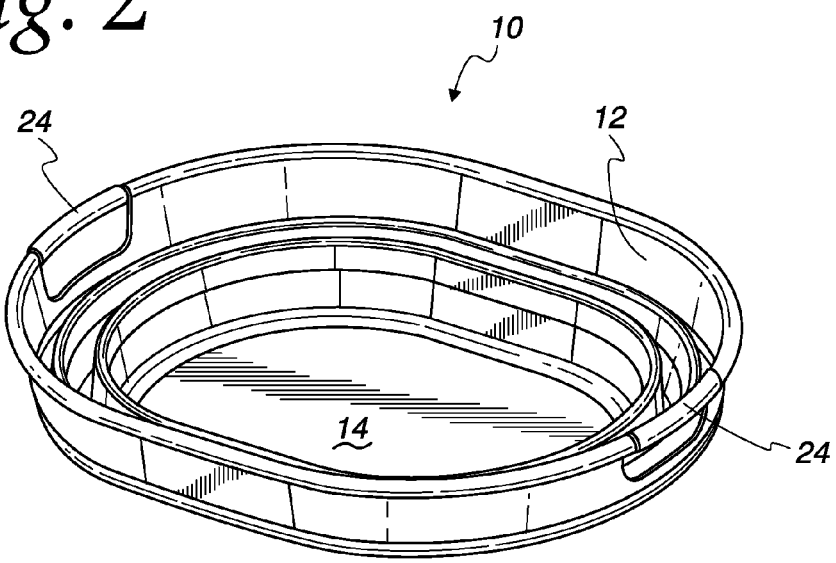
FIG. 2 is a perspective view of the laundry basket shown in FIG. 1, in a fully collapsed state.
Figure 3:
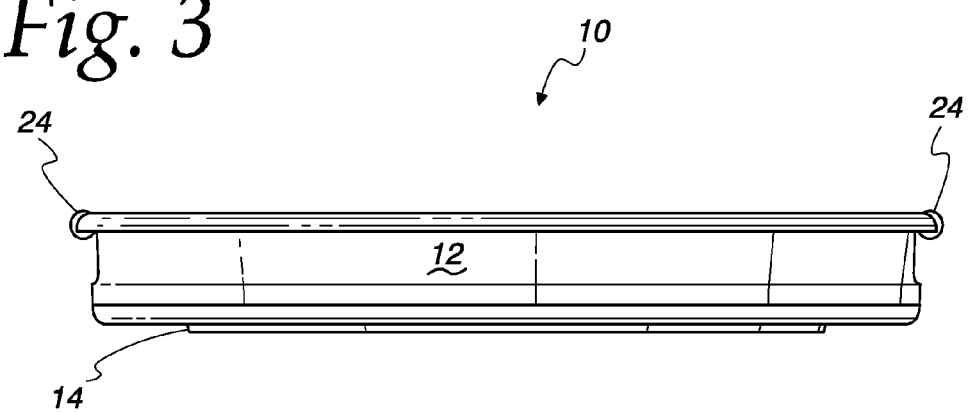
FIG. 3 is a side elevation view of the laundry basket shown in FIG. 1, in a fully collapsed state.

Flexible tiers 20 and 22 are illustrated as having two stable positions, one unfolded and one folded, respectively corresponding to relatively expanded and collapsed states of laundry basket 10. A fully expanded state of laundry basket 10 is illustrated in FIG. 1, showing both flexible tiers 20 and 22 in their unfolded positions, while a fully collapsed state of laundry basket 10 is illustrated in FIGS. 2 and 3, showing both flexible tiers 20 and 22 in folded positions. In its fully expanded state, laundry basket 10 provides its maximum laundry volume capacity, while in its fully collapsed state, laundry basket 10 is at its most compact, which is particularly beneficial for storage.

Two partially collapsed states of laundry basket 10 are illustrated by the fragmentary side sectional views shown in FIGS. 4 and 5, in which only flexible tier 20 or only flexible tier 22 is folded, respectively. Thus, it is illustrated that each of flexible tiers 20 and 22 may be folded and unfolded separately and independently to transform the shape of laundry basket 10 to its fully expanded, fully collapsed, and two partially expanded states illustrated in the Figures. Multiple advantages are provided by the partially collapsed states of laundry basket 10. For instance, when filling a laundry basket with clean laundry, it is often convenient to place the basket on a high surface near a dryer containing a load of clean laundry. The partially collapsed position of laundry basket 10 facilitates this process by making it easier to reach clean clothes over the top of laundry basket 10. In addition, when carrying a volume of laundry smaller than the maximum capacity of laundry basket 10, partially collapsing laundry basket 10 may make it more comfortable to carry. For example, when holding laundry basket 10 from underneath by bottom tier 14, laundry basket 10 will be easier to see over or around if in its collapsed state. On the other hand, when walking while holding laundry basket 10 by handles 24, partially collapsing laundry basket 10 may help to prevent one's knees from bumping into laundry basket 10, without having to hold the handles of laundry basket 10 as high as would be necessary if it were fully expanded. Lower handles formed in middle tier 18 (not shown), for example in the form of elongate slots with rounded ends, may also assist in this regard, whether or not laundry basket 10 is fully expanded.

With reference to FIGS. 6-8, a collapsible bucket 26 according to the invention is illustrated. Bucket 26 includes a rigid top tier 28, a rigid bottom tier 30, and a collapsible wall section including a rigid tier 34 disposed between flexible tiers 36 and 38. The fully expanded, fully collapsed, and partially collapsed states of bucket 26, illustrated in the drawings, are substantially analogous to those of laundry basket 10. Optionally, but preferably, bucket 26 includes a handle 40 connected to its top tier. Unlike laundry basket 10, which may advantageously include perforations to facilitate aeration, the body of bucket 26 is preferably imperforate so as to retain water or other liquid, although in certain embodiments not shown, bucket 26 may include a perforated bottom, for example, to serve as a sand-sifter for beach or sandbox amusement. Advantageously, when bucket 26 is filled with liquid, the collapsing action of the wall section provides a way of emptying at least some of the liquid contents, by simply pressing down on top tier 28 to cause the wall section to collapse, allowing the liquid to overflow. This avoids the need for lifting and/or inverting bucket 26, at least until the liquid level is lower, making those steps less strenuous.

Turning to FIGS. 9-11, a collapsible colander 42 embodying another aspect of the invention is illustrated. Colander 42 includes a rigid top tier 44, a rigid bottom tier 46, and a foldable wall section comprising at least one rigid middle tier 50 and at least two flexible tiers 52 and 54 above and below middle tier 50. Bottom tier 46 includes perforations 56 typically to facilitate draining water from rinsed salad greens, boiled pasta noodles, or other damp foods, as well as cooperating with tiers 54, 50, 52, and/or 44 to form a concave, curved surface to facilitate overturning contents.

As in the other collapsible containers according to the invention, fully expanding collapsible colander 42 provides its maximum volume capacity, while fully collapsing it provides for most compact storage. In the case of collapsible colander 42 one benefit of a partially collapsed state may be to minimize the refrigerator space occupied by a leftover salad or other dish prepared, and conveniently put away, in colander 42.

With reference to FIGS. 12-15, collapsible cup 58 embodying another aspect of the invention is illustrated. Cup 58 includes a body portion 60 comprising rigid top tier 62, a rigid bottom tier 64, and a foldable wall section 66 comprising at least one rigid middle tier 68 and at least two flexible tiers 70 and 72 above and below middle tier 68. As in the other collapsible containers according to the invention, fully expanding collapsible cup 58 provides its maximum volume capacity, while fully collapsing it provides for most compact storage. Cup 58 also includes a handle 74 pivotally connected to top tier 62 for movement between a use position shown in FIG. 12 and a compact or stowed position shown in FIGS. 13-15. It will be understood from FIGS. 12-15 that cup 58 must be collapsed before folding handle 74 to the stowed position, and conversely, handle 74 must be moved to the use position before expanding cup 58. Preferably, a suitable mechanism is provided for resisting movement of handle 74 away from the use position, so that the weight of liquid contained in cup 58 does not cause body portion 60 of cup 58 to pivot towards handle 74 when cup 58 is held by the handle, resulting in user annoyance and/or possible spillage. Examples of suitable mechanisms may include a detent for "snapping" handle 74 into and out of the use position and/or a tight-fitting pivot joint 76 providing frictional resistance over its full range of motion or only a partial range of motion near the use position. A similar retention mechanism may also be provided for keeping handle 74 in the stowed position. As an ancillary benefit, should flexible tiers 70 and 72 of foldable wall section 66 exhibit some degree of hysteresis, for example tending to spontaneously unfold when cup 58 is collapsed after being kept continuously in its fully expanded state for a long period of time, a retention mechanism for holding handle 74 in its stowed position may also help to retain body portion 60 of cup 58 in its fully collapsed state until the material of flexible tiers 70 and 72 returns to its normal behavior.

Figure 20:
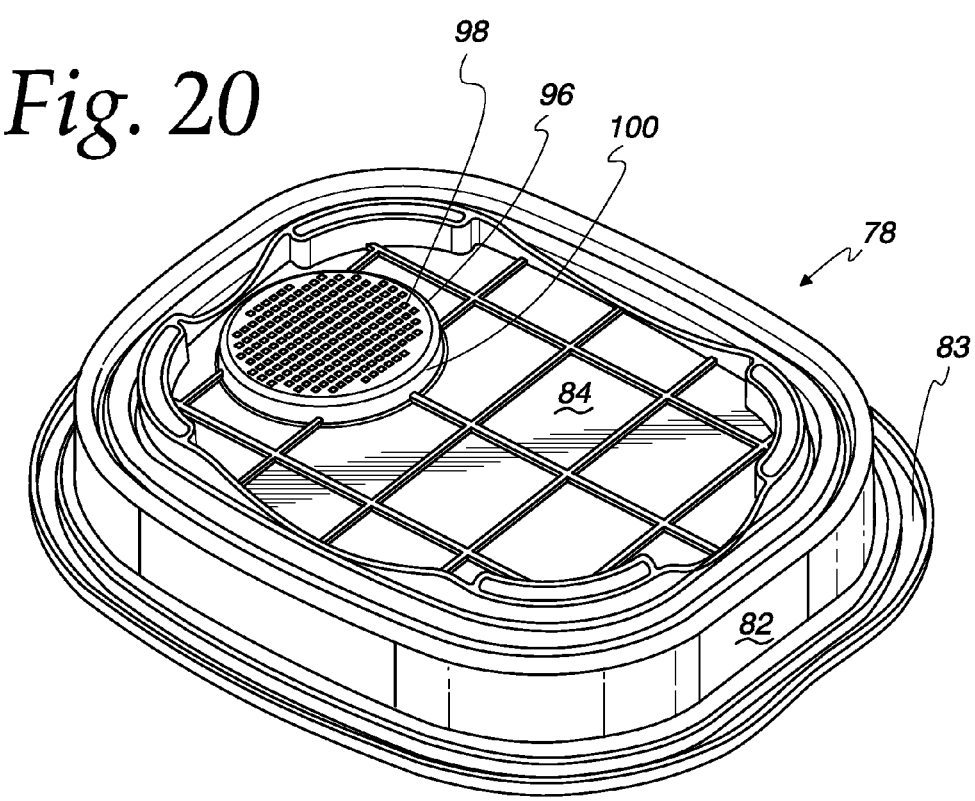
FIG. 20 is a bottom perspective view of the dish drainer shown in FIG. 16, in a fully collapsed state.

Turning to FIGS. 16-27 a collapsible dish drainer 78 embodying another aspect of the invention is illustrated. Dish drainer 78 includes a drainer body 80 comprising rigid top tier 82, preferably including a rim with a downturned portion defining a peripheral channel 83 for ease of lifting, as shown in FIG. 20; a rigid bottom tier 84, and a foldable wall section 86 comprising at least one rigid middle tier 88 and at least two flexible tiers 90 and 92 above and below middle tier 88. As in the other collapsible containers according to the invention, fully expanding collapsible dish drainer 78 provides its maximum volume capacity, while fully collapsing it provides for most compact storage. Dish drainer 78 includes an array of upstanding slender partitions 94 whose gap spacing, individual length, individual height, and other relevant dimensions are suited for retaining typically sized plates, bowls, and other dishes on edge between pairs of adjacent partitions 94. Additionally, although the spacing between partitions 94 in the illustrated embodiment of drainer 78 is generally uniform, multiple arrays of partitions having distinct spacing and/or individual dimensions may instead be provided as appropriate to accommodate differently shaped individual dishes or sets of dishes.

Dish drainer 78 also includes a perforated drain 96 to permit water drained from dishes in drainer 78 to drain out, for example into a sink or wash basin. Perforations 98 of drain 96 are set at the bottom surface of a depression having an imperforate wall section 100. As best seen in the side elevation views of drainer 78 (such as FIG. 18), the shape of bottom tier 84 is such that when its lowest portion rests on a horizontal surface to support drainer 78, the bottom of drain 96 is raised above the horizontal surface to permit free draining flow through perforations 98 and to inhibit soiling of drain 96, either by contact of drain 96 with the horizontal surface itself, or by backflow of accumulated liquid on the horizontal surface (such as the bottom of a sink basin) through perforations 98. Drain wall section 100 has a slight inward taper toward the bottom surface of the depression to facilitate covering and sealing drain 96 with a resilient drain plug 102. Advantageously, this permits drainer 78 to perform the additional function of a dish pan for soaking and/or hand washing dishes, while in its expanded state and having drain plug 102 inserted, as in the configuration illustrated in FIG. 16. However, as an alternative to the illustrated drainer 78 having a localized drain 96, it will be understood that a dish drainer having perforations extending across its entire bottom surface (not shown in the Figures) may have its own advantages, such as more rapid and/or complete draining of water from the interior surfaces of the drainer body, and/or better aeration to facilitate faster evaporation of water from the dishes and drainer.

Figure 21:
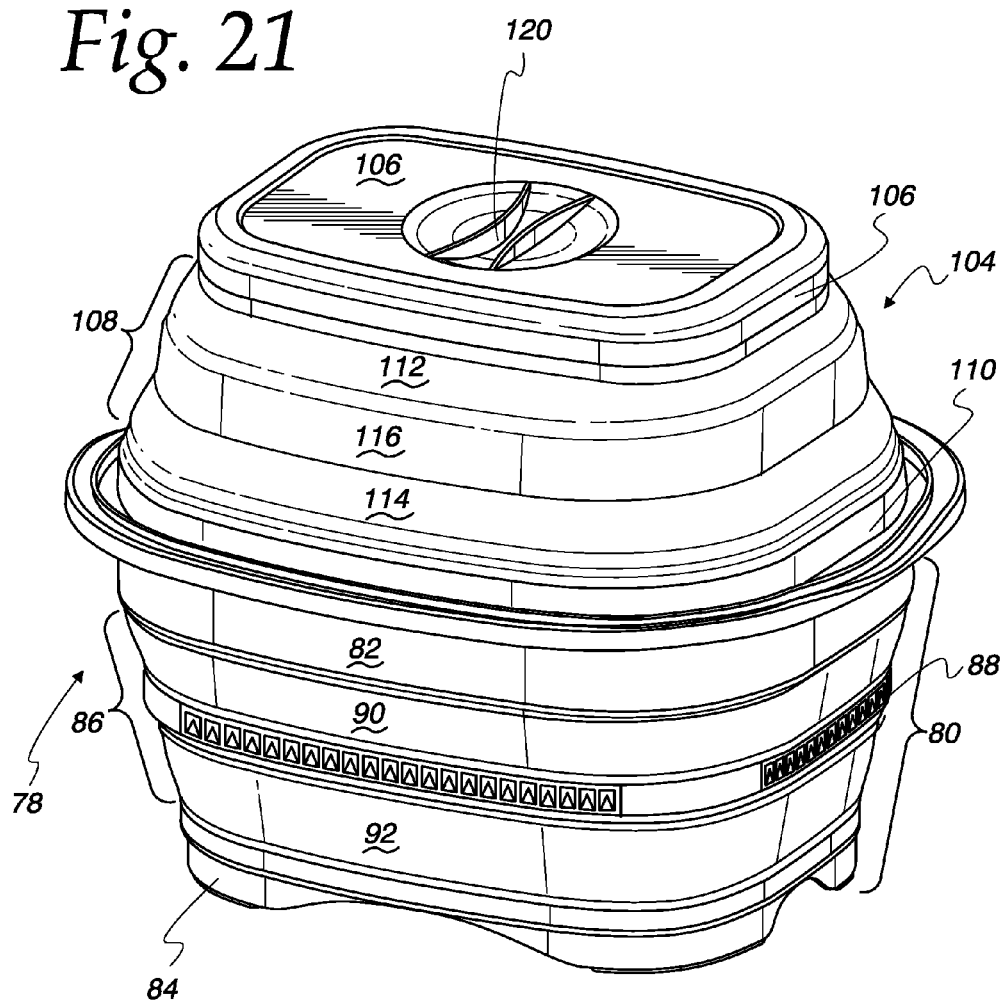
FIG. 21 is a top perspective view of the dish drainer shown in FIG. 16, having a collapsible lid placed thereon, the lid in a fully expanded state.
Figure 22:
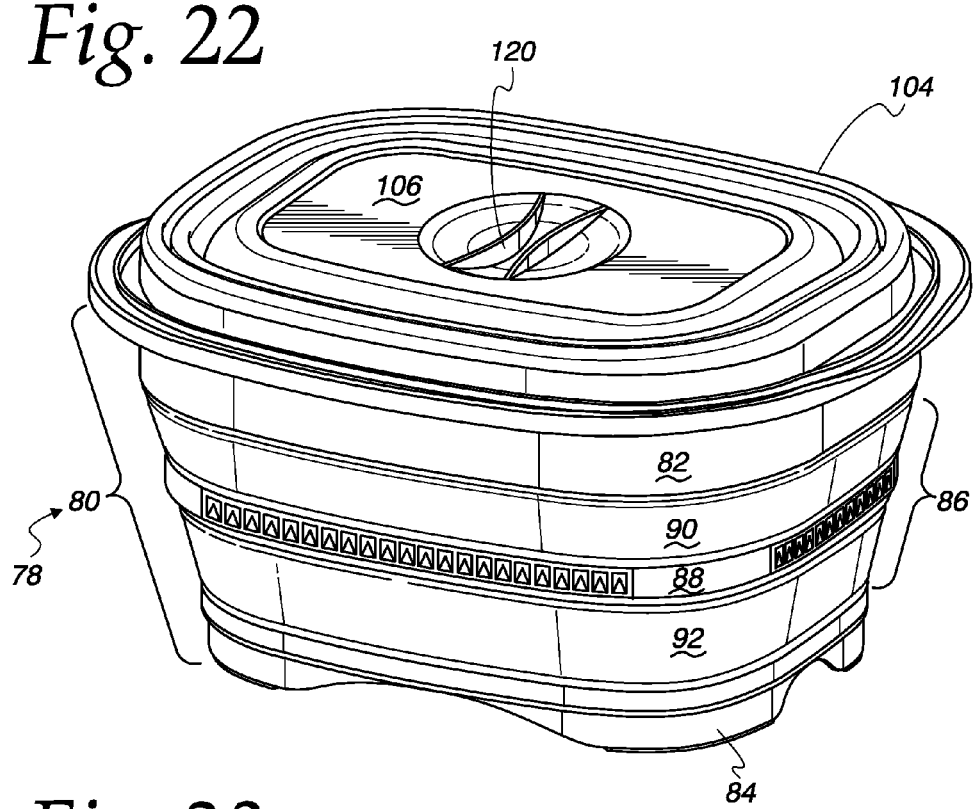
FIG. 22 is a top perspective view of the dish drainer shown in FIG. 16, having a collapsible lid placed thereon, the lid in a fully collapsed state.
Figure 23:
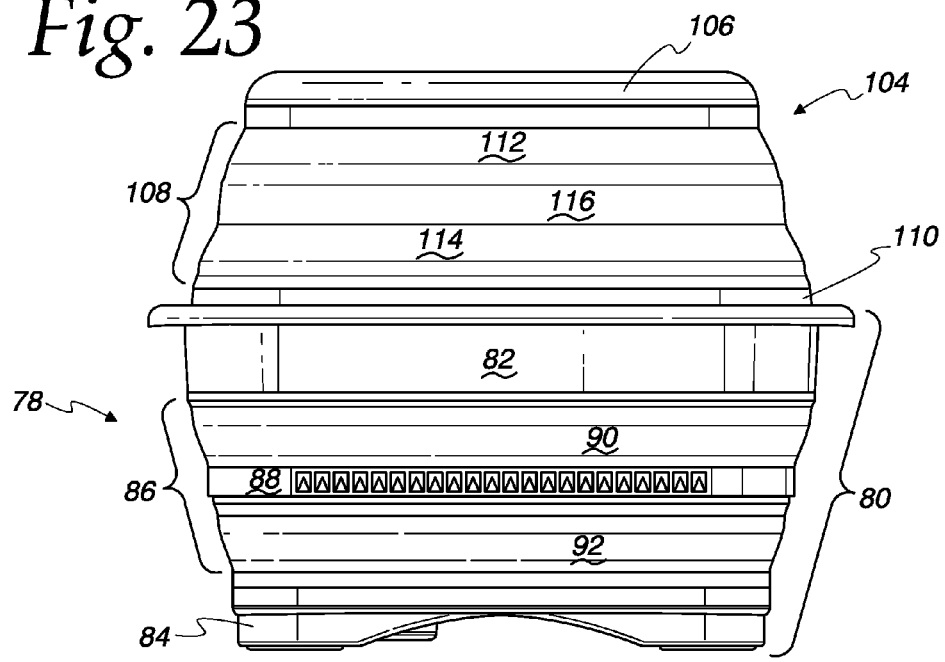
FIG. 23 is a side elevation view of the dish drainer shown in FIG. 16, having a collapsible lid placed thereon, the lid in a fully expanded state.
Figure 24:
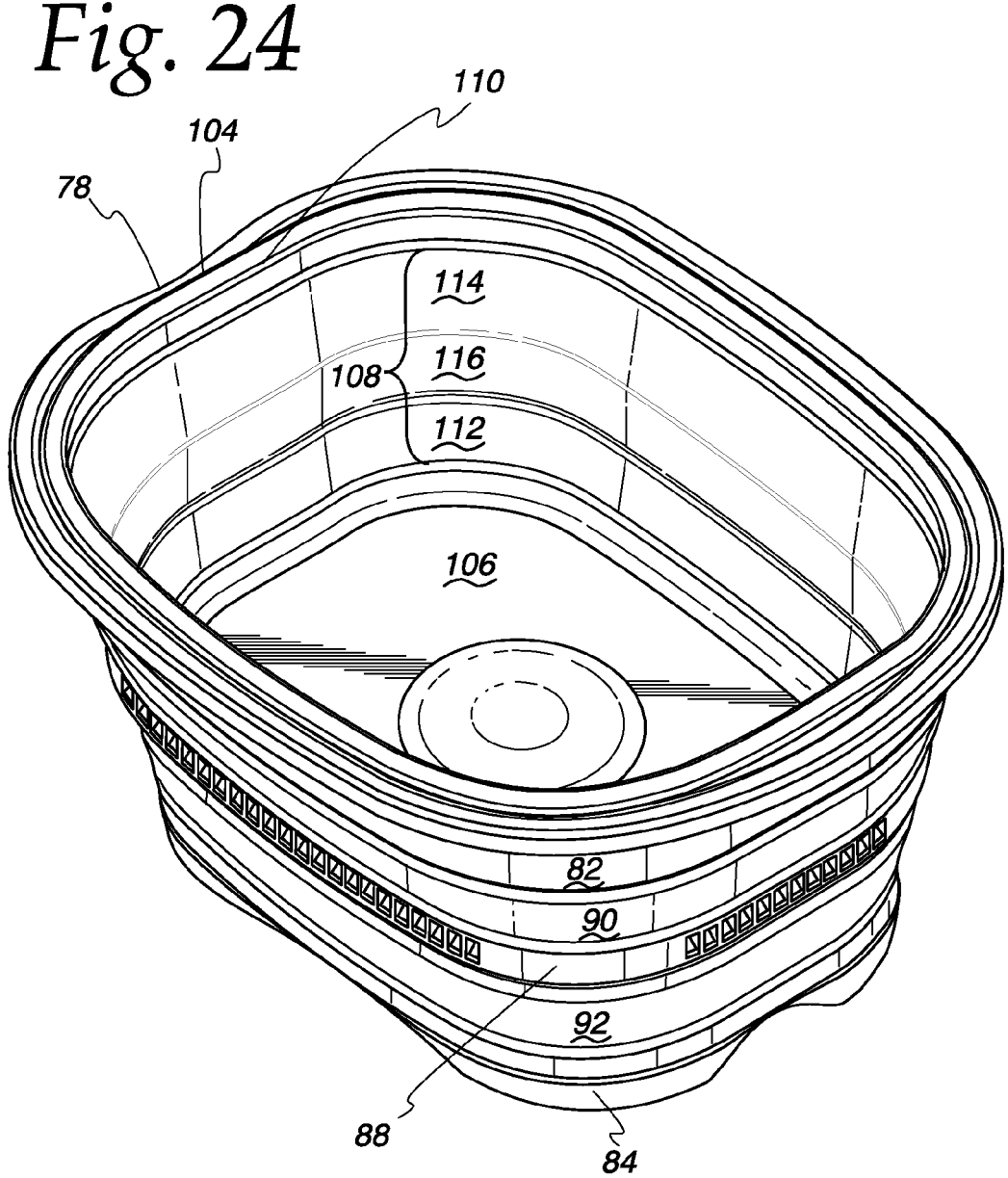
FIG. 24 is a top perspective view of the dish drainer shown in FIG. 16, having an upside-down collapsible lid nested therein, both drainer and lid in fully expanded states.

Optionally but advantageously, drainer 78 may be provided together with a complementary lid. In particular, a lid 104 may be provided which is also collapsible, including a stiff or rigid panel 106, a foldable wall section 108, and a stiff or rigid rim 110. Foldable wall section 108 of lid 104 is illustrated in the Figures as being entirely composed of a resilient, flexible material, including flexible tiers 112, 114 and a middle, stiff tier 116 that is made thicker and/or less tapered than flexible tiers 112, 114, so as to retain its orientation when flexible tiers 112, 114 fold relative to it. Rim 110 of lid 104 is sized to nest in a stepped portion 118 of drainer top tier 82 shown in FIGS. 16 and 17, in both a right-side-up orientation as shown in FIGS. 21-23 and an upside-down orientation as shown in FIGS. 24-27. Likewise, when collapsible lid 104 is first nested upside down in collapsible drainer 78, both lid 104 and drainer 78 being initially fully expanded (see FIG. 24, and the side elevation view of FIG. 27, which also illustrates that lid 104 fits entirely below the highest portions of drainer top tier 82), foldable lid wall section 108 is configured to collapse together with foldable drainer wall section 86 in a nested configuration illustrated in FIGS. 25 and 26, achieving the same contraction of the height dimension of drainer 78 as when drainer 78 is collapsed by itself.

Drainer 78 has several different use configurations, making it adaptable to different circumstances and user preferences, as well as different uses. For example, it has already been noted that drainer 78 may also serve as a dish pan for soaking and hand washing, when in an expanded state and having drain plug 102 inserted. When drainer 78 is employed in this way (or in any other configuration without lid 104 placed thereon), lid 104 in its upside-down, expanded configuration may simultaneously be used as another slightly smaller dish pan independent of drainer 78, for example to provide more volume for simultaneous soaking of more dishes. Alternatively, lid 104 may be placed over drainer 78 in its right-side-up orientation, either expanded (to provide more height clearance for tall dishes) or collapsed (for a more compact vertical profile), for example as desired for the purpose of protecting dishes in drainer 78 from inadvertent soiling or contamination while they are being soaked, as shown in FIGS. 21-23. To facilitate easy removal of lid 104, an inset handle 120 may be provided on the top side of lid panel 106.

When used for draining water from damp, clean dishes, on the other hand, drainer 78 may either be in a collapsed or an expanded state. The collapsed state provides the most unobstructed access to the bottom tier 84 of drainer 78, which may be particularly desirable for repetitive loading of dishes thereon from a lateral location, such as from a kitchen sink next to a counter (not shown) on which drainer 78 is placed, after washing each dish in the sink. (In such a situation, although not illustrated in the Figures, a conventional dish drainer tray, having three raised sides and one draining side placed over an edge of the sink, may beneficially be placed on the counter underneath drainer 78 to direct water drained from drainer 78 into the sink.) On the other hand, the expanded state of drainer 78 makes use of foldable wall section 86 and top tier 82 as partial splash guards to protect dishes from being soiled by splashing from lateral directions, which may likewise be desirable in the aforementioned situation of washing dishes in an adjacent sink while clean dishes are held in drainer 78. Alternatively, omnidirectional splash protection for dishes in drainer 78 may be provided by placing lid 104 over drainer 78, either in its expanded position shown in FIGS. 21 and 23 (again, to accommodate tall dishes or utensils, for instance), or its collapsed position shown in FIG. 22.

Still another function of drainer 78 with lid 104 placed on it may be to protect dishes placed in drainer 78 for transportation and/or storage. In this context, lid 78 may both help to keep airborne particles from entering drainer 78 and settling on dishes stored therein, but also may permit boxes, containers, or other items to be conveniently stacked on top of drainer 78 without resting directly on the dishes.

Of course, in the context of containers according to the present invention, as in common parlance, it will be understood that "stiff," "rigid," and "flexible" are relative terms. Thus unless further specified, referring to a tier of a wall structure as "stiff" herein simply means, at a minimum, that the tier is stiff enough to impart a force to its neighboring flexible tier or tiers sufficient to fold the flexible tier or tiers between relatively folded and unfolded stable positions (optionally causing the flexible tiers to "snap" between positions), without itself folding (i.e., without inverting its vertical orientation, with respect to the top and bottom of the container). On the other hand, a tier that is considered "rigid" for purposes of the invention typically will not even appreciably yield or deform, let alone fold, in the direction of the force imparted to fold the flexible tiers, in response to either that force or other typical loads associated with normal use of the container. Still further, a rigid tier preferably will not appreciably deform in any direction during normal use of the container. A "rigid" tier that exhibits the latter characteristic of not appreciably deforming in any direction is typically formed of a different material than the flexible tiers, rather than the same material in a different size or geometric configuration.

Although each flexible tier of the various household containers described herein is illustrated as having only two stable positions, it is also within the scope of the invention to provide one or more flexible tiers having a plurality of stable partially expanded positions, for example by providing one or more flexible tiers having a stepped profile comprising a series of accordion-like pleats of flexible material, the pleats comprising peripheral bands of material oriented in alternating directions and connected to adjacent bands by living hinges, so that each pleat can be independently folded and unfolded (not shown), being stable in either state. Also, a wall structure of a container according to the invention need not have the exact shapes of the containers shown in the Figures, but may have any suitable shape, such as round, oval, rectangular with rounded corners, or other shape as desired. For example, successive accordion pleats may be stable in relatively "bent" orientations, in which part of the circumferential length of a pleat is folded and the remainder of the length is unfolded.

Household containers according to the invention may be constructed of any suitable materials that impart relative stiffness or rigidity to the top tier, middle tier, and bottom tier; and relative flexibility to the flexible tiers, while permitting the tiers to be durably attached to their neighboring tiers. For example, the top tier, bottom tier, and/or middle tier may be composed of polypropylene, the flexible tiers being a thermoplastic elastomer overmolded onto the polypropylene. Alternatively, the top tier, bottom tier, and/or middle tier may be composed of metal or nylon, the flexible tiers being a silicone material overmolded onto the metal or nylon with adhesive glue between the two materials to strengthen their connection.

With the exception of lid 104 of collapsible dish drainer 78 (which may itself serve as a collapsible container independently of drainer 78), the middle tiers of the foldable wall sections of the various illustrated containers according to the present invention are shown and described above as being of a rigid material that is different from the flexible material of the adjoining flexible tiers. However, the structural strength and shape retention provided by a rigid middle tier of a different material is only one of many advantages provided by household containers of the present invention, and where desired, components that are merely "stiff," and optionally made of the same material as the flexible tiers, but formed with shapes and/or dimensions that promote stiffness, may be substituted in the place of "rigid" components of containers of the invention, while still retaining other advantages over existing containers.

While the invention has been described with respect to certain embodiments, as will be appreciated by those skilled in the art, it is to be understood that the invention is capable of numerous changes, modifications and rearrangements, and such changes, modifications and rearrangements are intended to be covered by the following claims.

What is claimed is:

1. A collapsible container comprising
a generally annular top tier;
a bottom tier including a generally horizontal support surface; and
a collapsible wall section connecting the top tier to the bottom tier, the collapsible wall section including at least three stacked, generally annular tiers;
the collapsible wall section, top tier, and bottom tier collectively defining a container body having a top opening, a generally closed bottom comprising the generally horizontal support surface of the bottom tier, a generally closed periphery comprising at least a part of the top tier and at least a part of the collapsible wall section, and a container volume disposed within the container body and below the top opening;
at least one of collapsible wall section tiers being a rigid middle tier; and
at least two of the collapsible wall section tiers being flexible and configured to fold between relatively expanded and relatively collapsed positions, including at least one flexible tier disposed above the middle tier and at least one flexible tier disposed below the middle tier, the flexible tiers being composed of a flexible material and the middle tier being composed of a rigid material different from the flexible material, the middle tier including an exposed exterior surface of the rigid material facing away from the container volume;
wherein a size of a container volume of the container can be increased by folding at least one of the flexible tiers from a relatively collapsed to a relatively expanded position and can be decreased by folding at least one of the flexible tiers from a relatively expanded to a relatively collapsed position.

2. The container of claim 1, the middle tier being composed of a material selected from the group consisting of polypropylenes, metals, and nylons, and the flexible tiers being composed of a material selected from the group consisting of silicones and thermoplastic elastomers.

3. The container of claim 1, further comprising adhesive material disposed in adhesive contact with a surface of the middle tier and an adjacent surface of one of the flexible tiers.

4. The container of claim 1, further comprising one or more mechanical fasteners connecting the middle tier to at least one of the flexible tiers.

5. The container of claim 1, at least one of the flexible tiers being adapted so that, when the bottom tier rests on a support surface in a substantially horizontal orientation, the at least one of the flexible tiers is stable in a relatively extended position and in a relatively collapsed position.

6. The container of claim 5, the at least one of the flexible tiers being stable in a fully extended position, a fully collapsed position, and at least one partially extended position.

7. The container of claim 1, the top and bottom tiers being substantially rigid and composed of a rigid material.

8. The container of claim 1, wherein each tier is at least substantially imperforate.

9. The container of claim 8, the container volume being at least substantially water impermeable.

10. The container of claim 1, at least a portion of at least one of the tiers being air permeable to permit some airflow into and out of the container without passing through the top opening.

11. The container of claim 1, the top tier comprising at least one attached handle.

12. A method of making a collapsible container, comprising
forming a rigid, generally annular top tier;
forming a rigid bottom tier comprising a generally horizontal support surface; and
forming a collapsible wall section connected to the top tier and the bottom tier, the collapsible wall section comprising at least a first rigid middle tier, a first flexible tier disposed between the middle tier and the top tier, and a second flexible tier disposed between the middle tier and the bottom tier, the flexible tiers being composed of a flexible material and the top, bottom, and middle tiers being composed of a rigid material different from the flexible material;
the collapsible wall section, top tier, and bottom tier collectively defining a container body having a top opening, a generally closed bottom comprising the generally horizontal support surface of the bottom tier, a generally closed periphery comprising at least a part of the top tier and at least a part of the collapsible wall section, and a container volume disposed within the container body and below the top opening;

the middle tier comprising an exposed exterior surface of the rigid material facing away from the container volume, each flexible tier being adapted to fold between at least one relatively expanded position and at least one relatively collapsed position.

13. The method of claim 12, further comprising
overmolding the first flexible tier onto the middle tier to connect the first flexible tier to the middle tier; and
overmolding the second flexible tier onto the middle tier to connect the second flexible tier to the middle tier.

14. The method of claim 13, further comprising
overmolding the first flexible tier onto the top tier to connect the first flexible tier to the top tier; and
overmolding the first flexible tier onto the bottom tier to connect the first flexible tier to the bottom tier.

15. The method of claim 12, further comprising
forming a second rigid middle tier disposed between the first rigid middle tier and the top tier; and
forming a third flexible tier disposed between the second middle tier and the top tier.

16. The method of claim 13, the middle tier being composed of a material selected from the group consisting of polypropylenes, metals, and nylons, and the flexible tiers being composed of a material selected from the group consisting of silicones and thermoplastic elastomers.

17. The method of claim 12, further comprising
connecting at least one of the first flexible tier and the second flexible tier to the middle tier by applying an adhesive material between them.

18. The method of claim 12, the flexible tiers being connected to the rigid tier by one or more mechanical fasteners.

19. A collapsible dish drainer comprising
a generally annular top tier;
a bottom tier including a generally horizontal support surface, the support surface including a drain and a plurality of parallel, upstanding partitions arranged to support dishware standing on edge between adjacent partitions; and
a collapsible wall section connecting the top tier to the bottom tier, the collapsible wall section including at least three stacked, generally annular tiers;
the collapsible wall section, top tier, and bottom tier collectively defining a drainer body having a top opening, a generally closed bottom comprising the generally horizontal support surface of the bottom tier, a generally closed periphery comprising at least a part of the top tier and at least a part of the collapsible wall section, and a drainer volume disposed within the drainer body and below the top opening;
at least one of collapsible wall section tiers being a rigid middle tier composed of a rigid material; and
at least two of the collapsible wall section tiers being flexible, composed of a flexible material different from the rigid material, and configured to fold between relatively expanded and relatively collapsed positions, including at least one flexible tier disposed above the middle tier and at least one flexible tier disposed below the middle tier, the middle tier including an exposed exterior surface of the rigid material facing away from the container volume;
wherein the size of the drainer volume can be increased by folding at least one of the flexible tiers from a relatively collapsed to a relatively expanded position and can be decreased by folding at least one of the flexible tiers from a relatively expanded to a relatively collapsed position.

20. The drainer of claim 19, wherein said drain is configured to be plugged by an insertable drain plug to render said drainer body at least substantially water tight.

21. The drainer of claim 19, further comprising a separate, collapsible domed lid, said domed lid comprising:
a generally annular bottom lid tier;
a top lid tier including a generally horizontal lid panel; and
a collapsible lid wall section connecting the top lid tier to the bottom lid tier, the collapsible lid wall section including at least three stacked, generally annular lid tiers;
the collapsible lid wall section, top lid tier, and bottom lid tier collectively defining a lid body having a bottom opening, a generally closed top comprising the generally horizontal lid panel of the top tier, and a generally closed periphery comprising at least a part of bottom lid tier and at least a part of the collapsible wall section;
at least one of collapsible lid wall section tiers being a stiff middle lid tier; and
at least two of the collapsible lid wall section tiers being flexible and configured to fold between relatively expanded and relatively collapsed positions, including at least one flexible lid tier disposed above the middle lid tier and at least one flexible lid tier disposed below the middle lid tier;
wherein the size of a lid volume disposed within the lid body and above the bottom opening can be increased by folding at least one of the flexible lid tiers from a relatively collapsed to a relatively expanded position and can be decreased by folding at least one of the flexible lid tiers from a relatively expanded to a relatively collapsed position.

22. The drainer of claim 21, said bottom lid tier being configured to be supported on said top drainer tier in a mating configuration with said top drainer tier whether said collapsible lid is oriented right-side-up or upside-down.

23. The drainer of claim 21, wherein said collapsible lid in an upside-down orientation is configured to nest inside said drainer body, at or below the level of the highest portion of said top drainer tier and at least substantially within said drainer volume, when said drainer and said lid are both in fully expanded states, and to collapse together with said drainer.

24. The drainer of claim 23, said collapsible lid remaining below the highest portion of said top drainer tier when said drainer and said lid are both in fully collapsed states.

25. A collapsible cup comprising
a generally annular top tier;
a bottom tier;
a collapsible wall section connecting the top tier to the bottom tier, the collapsible wall section including at least three stacked, generally annular tiers;
the collapsible wall section, top tier, and bottom tier collectively defining a watertight cup body having a top opening, a closed bottom generally across which the bottom tier extends, and a closed periphery comprising at least a part of the top tier and at least a part of the collapsible wall section, and a cup volume disposed within the cup body and below the top opening; and
a handle pivotally connected to the top tier;
at least one of collapsible wall section tiers being a rigid middle tier composed of a rigid material and including an exposed exterior surface of the rigid material facing away from the cup volume; and at least two of the collapsible wall section tiers being flexible, composed of a flexible material different from the rigid material, and configured to fold between relatively expanded and relatively collapsed positions, including at least one flexible tier disposed above the middle tier and at least one flexible tier disposed below the middle tier;

wherein the size of the cup volume can be increased by folding at least one of the flexible tiers from a relatively collapsed to a relatively expanded position and can be decreased by folding at least one of the flexible tiers from a relatively expanded to a relatively collapsed position; and wherein when the cup is in a fully collapsed state, said handle is pivotable so that at least a portion of said handle extends beneath and generally parallel to said bottom tier.

* * * * *